United States Patent [19]

Limb

[11] 3,761,613

[45] Sept. 25, 1973

[54] DUAL MODE VIDEO ENCODER

[75] Inventor: John Ormond Limb, New Shrewsbury, N.J.

[73] Assignee: Bell Telephone Laboratories, Incorporated, Berkeley Heights, N.J.

[22] Filed: June 20, 1972

[21] Appl. No.: 264,650

[52] U.S. Cl........ 178/7.1, 178/DIG. 3, 179/15.55 R, 325/38 B

[51] Int. Cl. ............................................. H04n 7/12

[58] Field of Search..................... 178/6, 7.1, DIG. 3; 179/15.55 R, 15 MW; 325/38 B, 38 R

[56] References Cited

UNITED STATES PATENTS

| | | | |
|---|---|---|---|
| 3,071,727 | 1/1963 | Kitsopoulos | 179/15.55 R |
| 3,553,362 | 1/1971 | Mounts | 178/6 |
| 2,946,851 | 7/1960 | Kretzmer | 178/DIG. 3 |
| 3,422,227 | 1/1969 | Brown | 179/15.55 R |
| 3,403,226 | 9/1968 | Wintringham | 179/15.55 R |

*Primary Examiner*—Robert L. Griffin
*Assistant Examiner*—Joseph A. Orsino, Jr.
*Attorney*—W. L. Keefauver and Daniel D. Dubosky

[57] ABSTRACT

A pair of differential encoders operate in conjunction with one another to achieve improved transmission characteristics. A frame-to-frame encoder including a frame memory operates in the standard manner during stationary portions of the picture. Control circuitry monitors the magnitudes of frame differentials, and responsively thereto identifies moving portions of the picture. For those portions identified as having motion, an output code is produced by an element-to-element encoder which differentially encodes consecutive elements in the line. Whenever the element-to-element mode is utilized, the frame memory is replenished by means of the element-to-element differentials.

7 Claims, 4 Drawing Figures

FIG. 3

| SITUATION | MODE CONTROL STATUS | PRIOR STATUS | TRANSMIT CONTROL | TRANSMIT SELECTION | IF LAST PICTURE EL. IN LINE, ADD |
|---|---|---|---|---|---|
| A NORMAL FRAME OPERATION | 0 | 0 | 0 | NOTHING | 8 BIT END OF LINE CODE AND 8 BIT LINE NUMBER |
| | 0 | 0 | 1 | 8 BIT ELEMENT ADDRESS<br>2 BIT FRAME-FRAME DIFF. | |
| B CHANGE: FRAME TO ELEMENT | 1 | 0 | MUST BE 1 | 8 BIT MODE WORD<br>8 BIT ELEMENT ADDRESS<br>4 BIT EL.-EL. DIFF. | 4 BIT MODE WORD<br>8 BIT END OF LINE CODE AND 8 BIT LINE NUMBER |
| C NORMAL ELEMENT OPERATION | 1 | 1 | MUST BE 1 | 4 BIT EL.-EL. DIFF. | |
| D CHANGE: ELEMENT TO FRAME | 0 | 1 | 1 | 4 BIT MODE WORD<br>8 BIT ELEMENT ADDRESS<br>2 BIT FR.-FR. DIFF. | 8 BIT END OF LINE CODE AND 8 BIT LINE NUMBER |
| | 0 | 1 | 0 | 4 BIT MODE WORD | |

DUAL MODE VIDEO ENCODER

BACKGROUND OF THE INVENTION

This invention relates to video transmission systems. More particularly, it relates to the efficient transmission of video signals with redundant aspects eliminated therefrom.

Early efforts to synthesize efficient video encoding systems resulted in the realization that much redundancy exists on a time-variant basis in many video signals. That is, while certain portions of a video field may at any given moment be experiencing quite a lot of change, the large majority of the field will at any given time be relatively stationary. Clearly, a video encoding system which transmits information for every sample of every video frame, whether or not it is presently experiencing change, is quite wasteful of the bandwidth generally available for video transmission systems. Accordingly, it has become a general design goal of video transmission system development to synthesize systems which efficiently encode video signals such that adequate subjective performance is achieved, but which are economical in their transmission aspects such that redundant aspects of the video signal are not transmitted.

One efficient class of redundancy reducing video encoder is described in U.S. Pat. No. 3,571,505 to F. W. Mounts and in a succession of improvement patents to the same inventor. These systems encode video samples on a frame-to-frame, rather than element-to-element basis. That is, in redundancy-reduction systems as described in the series of Mounts' patents, an entire video frame of samples is maintained both at the transmitter and at the receiver in a memory known as a frame memory. Input video samples, each representing separate picture elements, are compared with corresponding prior picture elements stored in the frame memory. Whenever the difference between a present sample and its corresponding stored sample is less than a predetermined threshold, a redundant sample has been discovered, and since such small differences are virtually imperceptible, no information need be transmitted. If, however, the difference between an input sample and a corresponding stored sample is greater than the predetermined threshold, the input sample is deemed nonredundant in that it exhibits a time varying change of sufficient degree that information must be transmitted. In the former case, when the difference is insignificant and no information needs to be transmitted, the sample from the frame memory is left unchanged. In the case in which a significant difference does exist, that difference is quantized and transmitted, and the information which is placed in the frame memory is the priorly stored sample plus the transmitted differential. In this manner, the transmitter encoder and the receiver decoder operate in synchronism while relying only on the transmission of nonredundant information.

From the foregoing discussion of frame-memory type redundancy-reduction systems, it is clear that areas of low to moderate motion are the ones most able to be processed economically. In other words, the efficiency of frame-to-frame type encoding is based primarily upon the premise that such coding will require relatively smaller amounts of information transmission for a large period of time. On the other hand, the efficiency of a straight-forward frame-to-frame type encoding degrades considerably during those periods in which large areas of the video field experience significant amounts of motion. During such times, it is likely that the advantages of frame-to-frame coding, which stem primarily from high time-varient correlation among picture elements, will evaporate, thereby rendering the straightforward frame-to-frame method a relatively inefficient one.

Accordingly, it is a primary objective of the present invention to provide an efficient redundancy-reduction system which maintains the beneficial characteristics of frame-memory systems during relatively stationary portions of the video field, but which avoids the shortcomings of frame-to-frame transmission in areas of the picture which have relatively high degrees of motion.

SUMMARY OF THE INVENTION

The present invention substantially enhances the efficiency of frame-to-frame type redundancy-reduction systems by utilizing an alternative encoding mode during the moving portions of the picture. More particularly, in addition to a more or less standard frame-to-frame encoding loop, there is also provided a differential element-to-element type encoding loop which is designed to be utilized during the moving portions of the video field. Normally, the frame memory is updated on a sample-to-sample basis by means of adding frame differentials to a picture element value from a previous frame. In those portions of the picture which are experiencing motion, however, the frame memory is updated on an element-to-element basis by adding element differentials to the magnitude of the previous element in the same line of the same frame. This alternate type of frame memory updating allows not only for a more efficient type of encoding for the individual classes of video signal, but also keeps the transmission of redundant information to a minimum. Moreover, due to the alternate type of updating of the frame memory, superior subjective performance is continuously maintained such that the overall system operation involves enhanced efficiency.

Transmission efficiency is attained in the alternate encoding scheme by means of an interdependent choice of code and definition of motion whereby the mode is shifted. More particularly, these factors are chosen such that whenever the average bit rate called for in one mode exceeds the average bit rate by the other mode (including addressing information) a shift occurs. Moreover, there exists a region in which it would be neither of advantage or disadvantage to shift, and in such region the encoding mode being utilized is simply continued.

In an illustrative embodiment of the present invention, a subtraction means periodically develops differentials between input picture element values and corresponding values from a frame memory. Simultaneously, a different element-to-element type encoder develops and quantizes differentials between succeeding picture elements in the same line, and control circuitry monitors the magnitudes of the frame-to-frame differences developed by the subtraction means. More particularly, a first threshold circuit determines whether or not an individual sample is redundant (i.e., whether the frame differential is smaller than a first threshold level) such that the advantageous aspects of frame-to-frame encoding may be maintained. In addition, a plurality of successive frame-to-frame differentials are maintained in storage such that a determination may be made whether the associated portion of the video field is moving or stationary. The encoding of each line in a frame commences in the frame-to-frame mode, and whenever four out of eight successive frame-to-frame differentials exceed the threshold level of a second threshold circuit, operation shifts into the element-to-element mode. Thereupon, element-to-element encoding continues until eight successive frame differentials are smaller than the second threshold level. At those times during which the frame-to-frame mode is being utilized, the frame memory is updated either by the priorly stored element value from the frame memory (if no information is to be transmitted), or by the combination of the priorly stored value with the recently developed nonredundant frame-to-frame differential (if the differential is to be transmitted). Whenever element-to-element coding is utilized, the frame memory is updated by the element differential encoder.

It is a feature of the present invention that frame-to-frame coding, with all its beneficial aspects, is conducted for just so much of a video field as is profitable. During the moving portions of the field, however, when frame-to-frame encoding is not profitable, a more efficient type of encoding is utilized. The cumulative result of these factors is that the overall operation exhibits excellent subjective performance while being quite economical of transmission bandwidth.

DESCRIPTION OF THE DRAWINGS

FIG. 3 shows a truth table which defines the output transmission specifications of the encoder of FIG. 1 for various picture element situations occuring in a video field.

DETAILED DESCRIPTION

Figure 1:
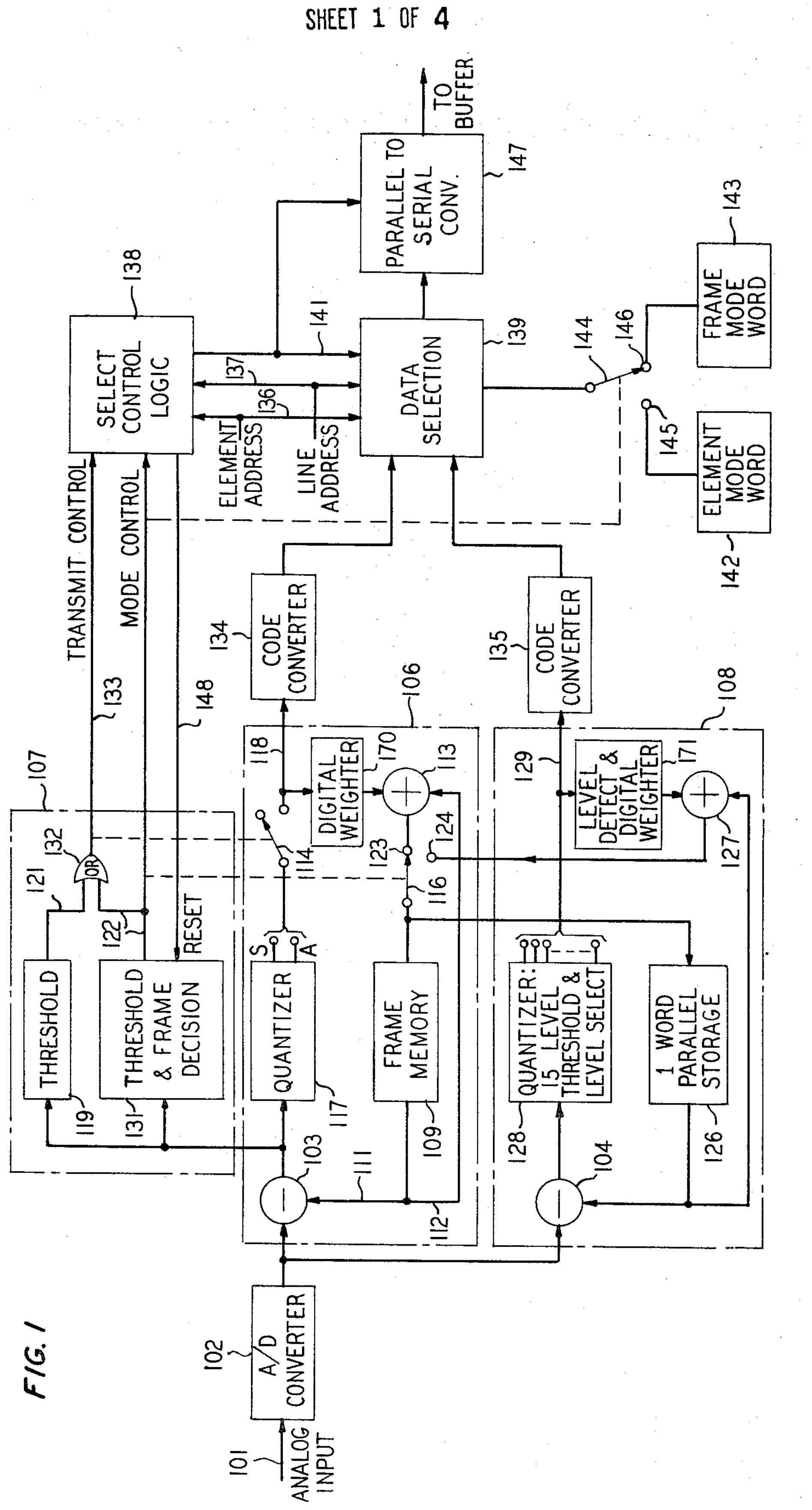
FIG. 1 describes an encoder which embodies the principals of the present invention.

FIG. 1 shows in block diagramatic form an encoder which embodies the principles of the present invention. The embodiment of FIG. 1 processes individual picture elements in digital form. Consequently, analog samples received at the input terminal 101 are first converted to PCM-type digital signals by an analog-to-digital converter 102. It would, of course, be equally acceptable to process input picture elements in their analog form, and such processing would merely require the omission of the analog-to-digital converter 102, the addition of digital-to-analog converters at the feedback inputs of subtraction circuits 103 and 104 and the modification of quantizers 117 and 128 and threshold circuits 119 and 131 to operate on an analog input signal. In either case, the type of process utilized, be it analog or digital, is immaterial to the principles of the present invention.

The embodiment of FIG. 1 operates for the most part with 8-bit precision except for the apparatus located between subtractor 103 and adder 113 and between subtractor 104 and adder 127. Thus, the input analog-to-digital converter 102 first converts analog input samples to an 8-bit, 256 level PCM format. Samples received by subtractors 103 and 104 from the analog-to-digital converter 102 are always positive in polarity, represented by 8 bits. The subtraction circuits 103 and 104 have 9-bit outputs, 8 representing quantizing levels and one representing polarity. It is broadly the function of the quantizers 117 and 128 to associate each of the 9-bit differential signals received at their inputs with a small number of companded quantizing levels. The first quantizer 117 utilizes four quantizing levels, and the second quantizer 128 utilizes 16 levels.

Figure 2:
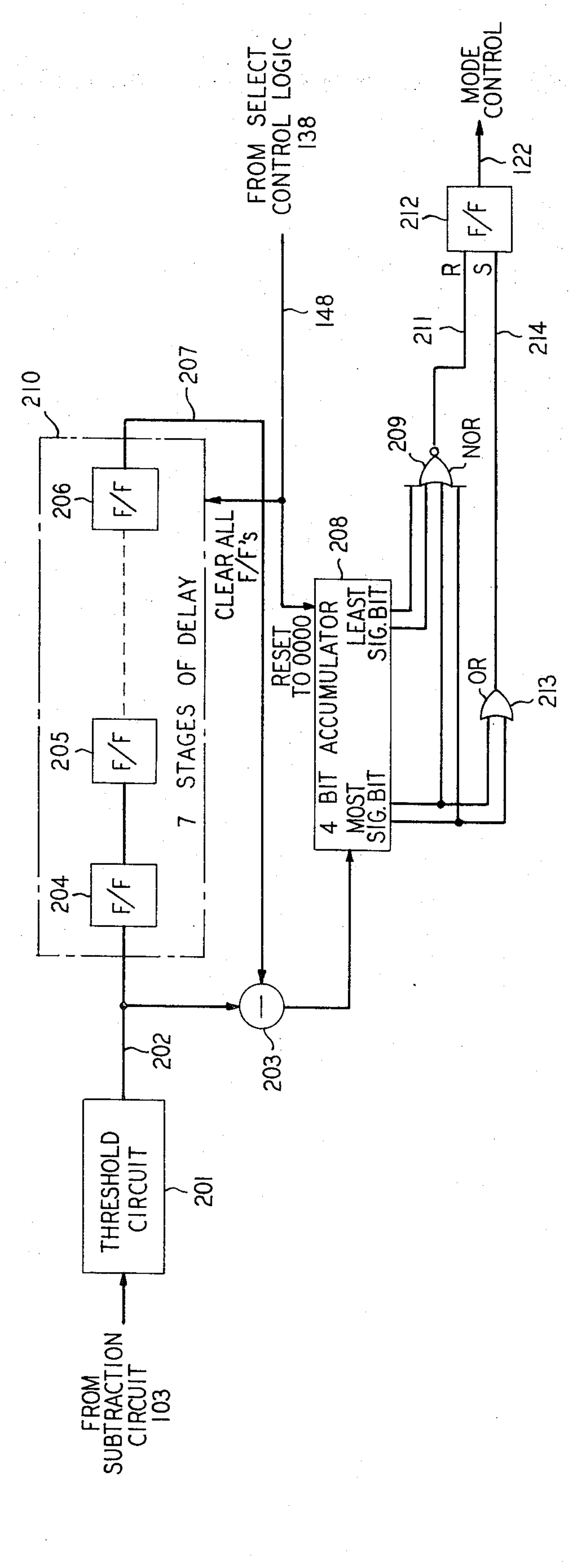
FIG. 2 shows a suggested embodiment of the control circuitry for the embodiment of FIG. 1.

The first quantizer 117 is embodied similarly to the quantizer 202 disclosed in FIG. 2 of U.S. Pat. No. 3,609,552 to J. O. Limb et al, and described in Column 3 thereof. Whereas the quantizer of the reference patent has four output wires representing eight quantum levels, quantizer 117 of FIG. 1 has but two output wires representing only four quantum levels. These two wires are coupled to an output code converter 134 and to a digital weighter 170. The code converter 134, which serves the function of associating the code from quantizer 117 with an efficient 2-bit output code, shall be described in detail hereinafter. The weighter 170 corresponds to the digital weighter 203 of the reference patent with the exception that it generates four output values (each of these four distinct values is represented by a different 8-bit word of appropriate polarity) rather than the eight output values generated in the reference patent. Thus, the digital weighter 170 couples signals in an appropriate form for processing by the adder 113, which utilizes the basic 8-bit precision.

The second quantizer 128 is embodied similarly to the combination of threshold network 104 and level selector 105 of FIG. 1 of U.S. Pat. No. 3,593,147 to E. F. Brown et al. The combined function of threshold network 104 and level selector 105 in the Brown et al reference patent is to embody 8 output levels in a form which can be represented by seven discreet 3-bit code words. It is noteworthy that the Limb et al reference patent utilizes a polarity bit plus a number of wires which represent the quantum levels (of both signs), whereas the Brown et al patent employs no specific sign bit and represents positive and negative levels by separate wires. This difference is insubstantial, and those skilled in the art are quite capable of converting signals of either form to signals of the other form. Therefore, the quantizer 128, while combining a threshold network and a level selector as per the Brown et al reference, has at its output a polarity bit plus seven wires. Thus the 16 output levels utilized are in the form of the Limb et al patent, but because of the operation of the level selector portion of quantizer 128, the output can be represented by the code converter 135 as only 15 output 4-bit code words (rather than the 16 that would be required if the quantizer operated exactly as in the Limb et al reference). In other words, the use of the Brown et al apparatus has been adopted solely to enable the code converter 135 to produce output code effectively while reserving one particular 4-bit code word. This 4-bit word will be detailed hereinafter.

The foregoing operation of the quantizer 128 was provided chiefly for the benefit of the code converter 135; therefore, prior to further internal processing by encoders 106 and 108, it is necessary to convert the information from the quantizer 128 back into suitable form for the adder 127. Accordingly, FIG. 1 contains apparatus 171 which includes first a level detector and secondly a digital weighter. The level detector apparatus reverses the process performed by the level selector aspect of quantizer 128 insofar as it operates by assigning the appropriate sign to the outer most quantum level from the quantizer 128. The level detector is embodied similarly to the level detector 108 shown in FIGS. 1 and 3 of the Brown et al reference. Whereas level detector 108 of the Brown et al reference operates with 4 input levels, however, the level detector aspect of apparatus 171 must operate with eight input levels. Moreover, as was previously discussed, since the output of quantizer 128 is in the form of a polarity bit plus 7 wires (rather than the 16 wires which would be required in accordance with the Brown et al reference), its interconnection with the level detection aspect of apparatus 171 is slightly different, but this difference is insubstantial and obvious to one skilled in the art. Thus, delivered to the digital weighter aspect of apparatus 171 is a polarity bit plus seven wires, thereby denoting the 16 quantizing levels. Finally, the digital weighter aspect of apparatus 171 is quite similar to digital weighter 203 of the Limb et al reference, the only difference being in the number of levels utilized. The output of the digital weighter 171 is coupled to the adder 127.

Basically, the apparatus of FIG. 1 comprises two different types of differential feedback encoders. The frame-to-frame encoder 106 operates in conjunction with a portion of the block of control circuitry 107 in much the same manner as do the standard frame-to-frame redundancy-reduction systems of the aforementioned F. W. Mounts patents. An element-to-element encoder 108 operates simultaneously with the frame-to-frame coder 106, but the data produced thereby is actually utilized only at such times as the control circuitry 107 enables it to be utilized. Accordingly, the general operation of the embodiment of FIG. 1 involves simultaneous parallel encoding by two different encoders 106 and 108 of notably different types, with a block of control circuitry 107 selecting the type of information to be transmitted in response to its determination of whether the portion of the video field currently being processed is moving or stationary and whether the instant frame-differential is redundant or not.

The digital PCM value of each analog input sample is coupled simultaneously to a pair of subtraction circuits 103 and 104. Subtractor 103 operates within the frame-to-frame encoder 106 and serves the basic function of producing frame-to-frame differentials. A frame-memory 109 stores digital information corresponding to an entire video frame of picture elements; as each input picture element is received by subtraction circuit 103, a corresponding prior picture element value is also coupled from the frame memory 109 to a second input 111 of the subtraction circuit 103. Thus, for each input picture element, subtraction circuit 103 develops a quantity which represents the difference between the instant input sample and the corresponding prior sample which is maintained in the frame memory 109. In addition, as each corresponding prior sample is coupled to subtraction circuit 103 via line 111, it is also delivered by means of a feedback line 112 to an adder 113. This connection with adder 113 fulfills a replenishment function whereby the frame memory 109 may be updated appropriately after each input picture element is processed. For present purposes it shall be assumed that switch 114 is closed and switch 116 is closed to terminal 123, whereby each differential produced by subtraction circuit 103, after being quantized and converted by quantizer 117 and PCM converter 170, is delivered both to an output line 118 from the frame-to-frame encoder 106 and to the digital adder 113. Thus, so long as switch 114 is closed, each processing of an analog input sample by subtraction circuit 103 eventually results in the combination of a quantized differential with the previously stored picture element from the frame memory 109 via line 112. Thereupon, whenever switch 116 is closed to terminal 123, the combination of the prior element value and the most recently computed frame-to-frame differential is read back into the frame memory 109.

It may be recalled from the foregoing description of the prior art that frame-to-frame redundancy-reduction systems have a general feature whereby each frame-to-frame differential is compared with a threshold level to determine whether it is sufficiently significant to warrant transmission at all; in other words, to determine whether each differential is redundant or not. Each differential which is developed by subtraction circuit 103 is coupled to a threshold circuit 119, which, in addition to other control threshold circuitry to be described in detail hereinafter, effects the operation of switch 114 and which thereby has the facility of preventing the frame-to-frame differential produced at subtraction circuit 103 from being coupled either to output line 118 or to the addition circuit 113. So long as the differentials produced by the subtraction circuit 103 are less than the threshold level of circuit 119, hereinafter designated as the "first threshold," the output state of line 121 is a logical 0, and, ignoring for the moment the state of line 122, switch 114 will be kept in an open position. In this case, the frame-to-frame differential under consideration is deemed to be a redundant one, since it is smaller than the first threshold level of circuit 119 and therefore is not to be transmitted. Since a logical 0 on the transmit control line 133 causes switch 114 to be kept open, no quantized value is delivered to output line 118, and the only input to adder 113 comes by means of feedback line 112. In this situation, assuming that switch 116 is closed to terminal 123, the frame memory is updated with the same prior picture element value most recently read out onto lines 111 and 112 and most recently used to compute the frame-to-frame differential. Whenver the frame-to-frame differential produced by subtraction circuit 103 is greater than the threshold level of threshold circuit 119, however, the output state of line 121 is maintained at a logical 1, and switch 114 is closed. In this case, the frame-to-frame differential has been determined to be nonredundant and it is coupled both to output line 118 and to adder circuit 113 via the PCM converter 170. Thus, the result of this situation is both the transmission of a nonredundant frame-to-frame differential and an updating of the frame memory 109 with the combination of the picture element from the frame memory via line 112 and the nonredundant frame-to-frame differential.

In summary, the frame-to-frame encoder 106 operates partly in conjunction with threshold circuit 119 of the control circuitry block 107 such that redundant frame differentials are not transmitted due to a logical 0 condition on transmit control line 133 and to the consequent opening of switch 114. On the other hand, nonredundant frame differentials are passed to an output line 118 and to the frame memory 109 due to a closure of switch 114. In either case, the frame memory 109 is updated by means of the output of addition circuit 113, which combines the priorly stored corresponding picture element from frame-memory 109 with associated nonredundant frame-to-frame differentials.

While the foregoing description of the operation of encoder 106 represents a more or less standard approach to frame-to-frame redundancy-reduction encoders, it is the addition of an element-to-element encoder 108 and associated aspects of control block 107 which allows for the advantageous operation of the principles of the present invention. Each input picture element which is delivered to subtraction circuit 103 of frame-to-frame encoder 106 is also simultaneously delivered to another subtraction circuit 104 contained in the element-to-element encoder 108. In form, the element-to-element encoder 108 is quite similar to any standard differential pulse code modulation (DPCM) type encoder with the exception of its nonstandard interactions with the frame-memory by means of switch 116. In the feedback circuitry of the element-to-element encoder 108 is contained a one word parallel storage memory 126 (embodied simply as a battery of parallel flip-flops) which receives in an iterative fashion each digital word which is placed into the frame memory 109, thereby subjecting each to a single element time delay. Since every input picture element which is delivered to subtraction circuit 103 results in a corresponding picture element subsequently being read into the frame memory 109, the net effect of reading the same word into the parallel storage circuit 126 is a one picture element time delay. In other words, at any given sampling time, the element being read out of the one-word parallel-storage means 126 is the version of the previous picture element which was most recently placed into the frame memory 109. This digital word is coupled both to the subtraction circuit 104 and, in a feedback manner, to an addition circuit 127. Consequently, the subtraction circuit 104 computes, for each input picture element, a differential between the input picture element and the version of the prior picture element which was most recently placed in the frame memory 109. Thus, the differential represented at the output of subtraction circuit 104 which is coupled to a quantizer 128 is an element-to-element differential for which the previous element basis is the one most recently placed into the frame memory 109 of the frame-to-frame encoder 106. Upon being quantized at the quantizer 128, the element-to-element differential is delivered to an output line 129 of element-to-element encoder 108 as well as to the PCM converter 171, whereupon it is coupled to the adder 127. Thus, for every input sample delivered to the encoder of FIG. 1, there is produced an element-to-element differential which is coupled to the addition circuit 127 where it is combined with a quantized version of the immediately preceding picture element from the same line. This combination is represented iteratively at terminal 124.

It is clear, therefore, that the position of switch 116, at either of terminals 123 or 124, determines which quantity shall be read into the frame memory 109 as well as into the parallel storage 126. So long as switch 116 is closed to terminal 123, the information which is read into frame memory 109 and also into the one-word parallel storage 126 is the combination of a frame-to-frame differential developed by subtraction circuit 103 with a prior corresponding picture element from the frame memory 109. On the other hand, whenever switch 116 is closed to terminal 124, the information which is read both into the frame memory 109 and to the one-word parallel storage 126 is the combination of the element-to-element differential developed at subtraction circuit 104 with the previous element value from the one-word parallel storage 126.

Since the position of switch 116 controls the class of information which is read both into the frame memory 109 and into the one-word parallel storage 126, complete understanding of the operation necessitates a discussion of the functioning of the control circuit block 107. As was described hereinbefore, the first threshold circuit 119 energizes line 121 and thereby controls switch 114 in accordance with whether samples under consideraion are redundant or nonredundant. Whenver the encoder of FIG. 1 is operating in a frame-to-frame mode (i.e., when switch 116 is closed to terminal 123), the opening or closing of switch 114 under the control of threshold circuit 119 determines whenever any information at all will be transmitted. Additionally, the threshold and frame decision circuit 131 also is responsive to the output of subtraction circuit 103. In fact, the particular function of the threshold and frame decision circuit 131 is to establish control over the conversion mode being utilized by controlling the position of switch 116 and, under certain circumstances, of switch 114 as well. Whenever the state of line 122 is a logical 0, switch 116 is closed to terminal 123, thereby establishing a frame-to-frame mode, and the positioning of switch 114 depends solely on the output state of the first threshold circuit 119. Whenever the output of threshold and frame decision circuit 131 is a logical 1, however, switch 116 is closed to terminal 124 and, due to the operation of OR gate 132, a logical 1 state is also maintained upon transmit control line 133. Thus, output samples will always be transmitted whenever an element-to-element mode is established (the particular operation of the transmit control line will be detailed hereinafter). Moreover, the closure of switch 114 due to the logical 1 condition on line 133 has no effect at all, since the element-to-element quantities from terminal 124 are then used to update the frame memory 109.

In summary, the control circuitry block 107 operates in response to the magnitude of the frame-to-frame differentials produced at subtraction circuit 103, and in response thereto, controls the position of switches 114 and 116. Whenever the output state of threshold and frame decision circuit 131, as represented at line 122, is a logical 1, switch 116 is closed to terminal 124 and the position of switch 114, although closed, is without effect. Whenever the output state of the threshold and frame decision circuit 131 is a logical 0, switch 116 is closed to terminal 123 and the state of switch 114 depends solely upon the output condition of threshold circuit 119.

The threshold and frame decision circuit 131 of FIG. 1 may be embodied by the apparatus shown in FIG. 2. Frame differentials from the subtraction circuit 103 are delivered to a threshold circuit 201. It is the function of the threshold circuit 201 simply to determine whether the differentials received at its input are less than or greater than a given threshold level (hereinafter designated the "second threshold" to distinguish it from the first threshold of threshold circuit 119), and to produce a binary output condition in response thereto. Thus, if a given frame differential from subtraction circuit 103 is greater than or equal to the second threshold, a digital 1 is produced at output line 202. Otherwise, output line 202 is maintained in the logical 0 state. Each output digit produced by the threshold circuit 201 is coupled both to a digital subtraction circuit 203 and to a seven-stage digital delay line 210 including flip-flops 204, 205, and 206. The apparatus of FIG. 2 controls the operation of switches 114 and 116 of FIG. 1 in response to the magnitudes of eight successive frame-to-frame differentials, and the seven-stage delay line 210 including flip-flops 204 through 206, stores 7 bits of information corresponding to seven successive frame differences, each of which indicates whether a corresponding frame-to-frame differential is greater than or less than the second threshold level. Each bit which is produced at output line 207 of the seven-stage digital delay line 210 is also coupled back to an input of the subtraction circuit 203.

The output of the subtraction circuit 203 represents whether a given input bit from the output line 202 of the threshold circuit 201 is the same as, equal to, or in what different respect it is different from the bit on line 207 which was produced by the threshold circuit 201 eight picture element times earlier. By proceeding thusly, the output of subtraction circuit 203 designates whether a change is occurring in the character of information currently stored in the seven-stage digital delay line 210. In other words, at any given point in time, the seven sequential flip-flops 204 through 206 plus the threshold circuit output 202 contain information corresponding to the magnitudes of eight successive frame-to-frame differentials relative to the second threshold level. For each new bit produced by the threshold circuit 201, there will be either a net increase of one logical 1 bit, a net decrease of one logical 1 bit, or no change at all in the number of digital one bits currently stored (each of these changes corresponds respectively to input/output conditions of the seven-stage line of 1/0, 0/1, and either 1/1 or 0/0). The output of subtraction circuit 203 therefore responds solely to changes in the number of logical 1 s stored in the seven-stage digital delay line 210. Thus, it is beneficial to define the input/output characteristic of subtraction circuit 103 to be a positive voltage-V whenever line 202 is in a logical 1 state and line 207 is in a logical 0 state, a negative voltage-V whenever line 202 is in a logical 0 state and a line 207 is in a logical 1 state, and zero volts whenever lines 202 and 207 are both in the same state, be it logical 0 or logical 1. In accordance with this purpose, the subtraction circuit 203 may be embodied by any of a large number of digital comparators well known in the art.

The output voltages from the subtraction circuit 203 are coupled to a 4-bit accumulator 208. The accumulator 208 is embodied as an up-down counter type of circuit which maintains a 4-bit digital count in response to the input voltages received from the subtraction circuit 203. Each time a pulse of positive voltage is received from subtraction circuit 203, the digital counter of the accumulator 208 increases by one; on the other hand, for each receipt of a negative voltage pulse, the digital count in the accumulator 208 decreases by one. Of course, as long as the output of subtraction circuit 203 is zero volts, no change occurs in the 4-bit accumulator 208. It is apparent, therefore, that the digital count of the 4-bit accumulator 208 represents at any given time the number of logical 1 s then being stored in the seven-stage delay line 210. Moreover, for each change in the number of logical 1 s in the seven-stage delay line 210, there is a corresponding change in the digital count stored in the accumulator 208.

The present embodiment of the invention is grounded on the proposition that the status of four out of eight consecutive samples with respect to a threshold level is indicative of whether or not motion is occurring. More particularly, in accordance with the choice of code detailed at some length hereinafter, the status of four out of eight consecutive samples represents an efficient cutoff point above which straightforward frame-to-frame transmission becomes unprofitable, whereas element-to-element transmission is advantageous. Moreover, as the number of samples greater than the threshold increases above four out of eight, the advantage of element-to-element encoding becomes even more pronounced. It must be emphasized, however, that four out of eight samples represents merely one of a large number of advantageous possibilities, any of which could be used without departing from the scope of the present invention.

The circuitry of FIG. 2 particularly controls the operation of switches 114 and 116 of FIG. 1 by means of a monitoring of the digital count stored in the accumulator 208. All four output bits of the accumulator 208 are coupled to a NOR gate 209, the output of which is in turn coupled to the RESET terminal 211 of an RS flip-flop 212. Similarly, the two most significant bits from the accumulator 208 are coupled to an OR gate 213, the output of which is in turn coupled to the SET input 214 of the flip-flop 212. The significance of this processing of the output bits from accumulator 208 by gates 209 and 213 is as follows: Since the accumulator output bits represent a binary count of the number of logical 1 s currently stored in the seven-stage delay line, the coupling of the two most significant bits to the *s* input 214 via OR gate 213 is tantamount to energizing the *s* input and thereby forcing the mode control terminal 122 into a logical 1 state whenever four or more logical 1 s are being stored in the seven-stage delay line. Similarly, RESET terminal 211 is energized, thereby forcing output terminal 122 of flip-flop 212 into a logical 0 state, whenever no logical 1 s are then in storage in the seven-stage delay line. Whenever the output of the accumulator 208 is equal to the digital conditions 0001, 0010, or 0011, no change occurs in the output 122 of flip-flop 212, since neither of gates 209 and 213 are energized thereby. Consequently, the threshold and decision circuitry of FIG. 2 retains a certain "hysteresis" effect in that an intermediary state exists (corresponding to accumulator output states 0001 through 0011) wherein no change in mode control may result, and the output state which previously existed at flip-flop output 216 remains unchanged.

In summary, the output state of flip-flop 212 is directly related to the number of times in which the differentials from subtraction circuit 103 exceed the second threshold level, as detected by the threshold circuit 201. Each time four or more of the previous eight successive frame-to-frame differentials exceed the second threshold level, *s* input 214 is energized, thereby forcing mode control line 122 into a logical 1 state. This state is retained until such time as eight successive frame-to-frame differentials are less than the second threshold level. At such time, the R terminal 211 of flip-flop 212 is energized, thereby forcing mode control terminal 122 into a logical 0 condition. Whenever between one and three of eight successive frame differentials exceed the second threshold level, no change is warranted in the output state of flip-flop 212, and it remains unchanged whether it is a logical 0 or a logical 1.

Therefore, switches 114 and 116 are responsive to the magnitudes of eight consecutive differentials from the subtraction circuit 103 in the following manner. In an area of the picture in which at least four out of eight consecutive frame-to-frame differentials are greater than the second threshold level, thereby indicating a portion of the video field wherein motion is occurring, switch 116 is closed to terminal 124 and switch 114 is closed (although this closure has no effect). The switches then remain in that position until eight consecutive frame-to-frame differentials are less than the second threshold level, thereby indicating a stationary area of the picture, whereupon switch 116 is closed to terminal 123, and the position of switch 114 is exclusively controlled by the magnitudes of each given differential with respect to the first threshold level.

The apparatus of FIG. 2 also shows an input line 148 coming from the select control logic 138. While the operation of that logic circuitry will be detailed hereinafter, it is appropriate at this point briefly to mention the function played by the select control logic in the operation of the apparatus of FIG. 2. The embodiment of FIG. 1 is designed such that the encoding of each line will begin in the frame-to-frame mode. Thus, it is important not only to cause switch 116 to be closed to terminal 123 at the end of each line, but also to clear the information stored from the previous line in the threshold and frame decision circuitry 131. The connection of line 148 to the seven-stage delay line 210 and to the 4-bit accumulator 208 from the select control logic 138 at the end of the encoded line causes the contents of the seven-stage delay line to become all zeroes. In this way, the control circuitry shown in FIG. 2 is prepared immediately to commence encoding the next picture line in the frame-to-frame mode.

In accordance with the foregoing, four distinct quantities of information are produced by encoders 106 and 108 and the control circuit block 107. First, each of encoders 106 and 108 produces a digital form of the appropriate type of differential, either frame-to-frame or element-to-element. These differentials are represented respectively at terminals 118 and 129. In addition, the control circuitry block 107 produces both transmit control and mode control signals. The mode control signal is represented at line 122 and is simply the output state of flip-flop 212 of FIG. 2. Thus, the mode control signal dominates switch 116, which in turn determines whether the frame differential or the element differential is to be utilized. The transmit control signal is produced at output line 133 of OR gate 132, thereby representing the aggregate effect of the operation of threshold circuit 119 and threshold and frame decision circuit 131. Therefore, the transmit control signal indicates basically whether any information will be transmitted for a corresponding input picture element. That is, a logical 1 in transmit control line 133 indicates the presence of a nonredundant frame differential or of operation in the element mode, both of which cause encoded differentials to be transmitted.

The remainder of the apparatus in FIG. 1 simply provides the functions of code conversion and output digit choice such that sufficient information is translated for a receiver to reassemble the picture in synchronous harmony with the frame memory 109.

First, a pair of code converters 134 and 135 translate the output of the quantizers 117 and 128 into suitable output code. It may be recalled that the output code from the quantizers has been defined as an "all less than" code including a polarity bit as well as a number of bits which correspond to quantum levels. For example, the output of quantizer 117 is represented by three wires, a polarity wire plus two lines which correspond to a pair of quantum levels. It is clear that these three wires only in fact represent four quantum levels and therefore may be efficiently represented by a 2-bit binary code. Thus, coder 134 serves the function of converting the four level output of quantizer 117 into a 2-bit output code, which may be standard binary coded decimal, reflected binary code, gray code, or the like. This 2-bit output code represents the frame-to-frame differentials which are to be transmitted. Similarly, quantizer 128 has fifteen output wires, each representing a different quantum level. It will be shown below that it is necessary for one 4-bit word to be reserved to indicate operation in the element-to-element mode. Thus, one particular binary word must be reserved for this purpose, thereby using the extra code word which was not used in the quantizer 128. The code converters 134 and 135 may be straightforwardly embodied by any of a large number of digital code converters which are well known in the art.

The remainder of the apparatus of FIG. 1 serves generally to multiplex the coded differentials from coders 134 and 135 along with sufficient addressing information such that a receiver may reconstruct the input picture in its entirety. In accordance with this purpose, element address and line address information is delivered respectively at lines 136 and 137. Although the timing for the apparatus of FIG. 1 is not indicated, all synchronization is achieved on a completely standard basis. Thus, the element address information delivered at line 136 corresponds on a one-to-one basis with each picture element developed by the analog-to-digital converter 102. Similarly, the timing of the line address information is dependent upon the horizontal synchronization and is delivered at line 137.

Both the element address and line address information are coupled to a pair of circuits which perform a multiplexing operation, the select control logic 138 and the data selection circuit 139. It is the principle function of the select control logic to monitor the transmit control, mode control, element address, and line address information, and in response thereto to determine precisely which information must be transmitted, including not only the appropriate addressing information, but also the actual encoded differentials which form the basis for the encoded video frame. Accordingly, the data selection circuit 139 operates responsively to the selection made by the select control logic 138. In other words, the decision having been made by the select control logic 138 as to the particular information which must be transmitted, the data selection circuit 139 actually accomplishes that selection.

In addition to transmitting the addressing and encoded differential information, it is also necessary occasionally to transmit coded words which will inform the receiver that a shift of mode is taking place. This function is performed by a pair of word generating circuits 142 and 143, which are coupled to the data selection circuit 139 by way of a single pole double throw switch 144, operating under the control of the mode control signals on line 122. The mode word generation circuits 142 and 143 each have the capability of generating a particular word whenever energized. More particularly, the 8-bit frame-to-element mode word generated by circuit 142 is a specific 8-bit digital word, the occurrence of which immediately notifies the receiver that the following differentials are to be encoded (and decided) in the element-to-element mode. For example, this 8-bit mode designating word may be defined as 11111111. The 4-bit element-to-frame mode word generated by circuit 143 is a particular 4-bit word, the occurrence of which immediately notifies the receiver that the following differentials are to be encoded (and decided) in the frame-to-frame mode. For example, this 4-bit mode word may be defined as the digital word 0000. The significance of the 4-bit and 8-bit word lengths will be clarified in the ensuing discussions.

Switch 144 accomplishes the purpose of coupling the proper mode word to the data selection circuit 139 as follows. Whenever the state of the mode control line 122 is a logical 1, switch 144 is closed to terminal 145, and whenever the state of the mode control line 122 is a logical 0, switch 144 is closed to terminal 146. Thus, the data selection circuit is coupled to the 8-bit word generating circuit 142 whenever the apparatus of FIG. 1 is operating in the element-to-element mode, and to the 4-bit word generating circuit 143 whenever the apparatus of FIG. 1 is operating in the frame-to-frame mode. Thus, the particular mode indicating words may be appropriately selected by the data selection circuit 139 in response to the commands to do so from the select control logic 138. In practice, 4- or 8-bit words are only transmitted at the beginning of each run of the associated mode.

Finally, the information which is selected by the data selection circuit 139 is coupled to a parallel-to-serial converter 147, where it is translated into a sequential mode. Thereupon, the sequential digits are coupled to an output buffer to allow transmission thereof.

The data transmission circuitry of FIG. 1 including the circuit control logic 138, the data selection circuit 139, and the parallel-to-serial converter 147 perform functions which have long been well known in the art. Moreover, given a statement of functional requirements which must be performed by such circuitry, it is completely within the ability of those skilled in the art to construct adequate embodiments of the circuitry. That is, the skilled worker only needs to be provided with a definition of the logical operations to be performed, whereupon it is quite obvious how it is to be done. FIG. 3 shows a truth table which defines each possible operational situation which may occur at various locations on a picture field, and the corresponding items of information which must be selected by data selection circuit 139 and transmitted. The truth table of FIG. 3 is grounded on the following propositions. Each frame-to-frame differential which must be transmitted will be expressed as a 2-bit frame-to-frame differential produced by code converter 134. Similarly, each element-to-element difference which is to be transmitted is expressed by a 4-bit differential produced by code converter 135. This disparity in the number of digits utilized reflects the expected degree of change in moving and stationary portions of the picture. That is, stationary areas usually have only minor amplitude changes such that two digit words are sufficient, whereas moving areas tend to have larger amplitude changes, and thus need more levels. Thus 4-bit element-mode words are utilized. Each time an element address or line address must be transmitted, it is done so by way of an 8-bit word received at lines 136 and 137. At the end of each line, an 8-bit end-of-line coded number is received at line 136 (this word like the above-mentioned 4- and 8-bit words, constitutes a particular digital word which exclusively corresponds to the occurrence of the end of each line in the frame), and an 8-bit line number is received at line 137. Finally, the 4- and 8-bit mode change words produced by circuits 142 and 143 may be coupled to the data selection circuit 139.

It has been provided that every line commences being coded in the frame-to-frame mode. Thus the start of each line is represented by situation A of FIG. 3, labeled "normal frame operation," when the mode control status is zero. Similarly, the "prior status" column, which indicates the status of the mode control line 122 for the picture element immediately preceding the element being processed, is also a zero. In such case, the particular information which must be transmitted is dependent on the transmit control signal. If the transmit control is a logical 0, indicating redundancy, nothing at all needs to be transmitted. If, however, the transmit control signal is a logical 1, indicating a nonredundant frame-to-frame differential, the transmit selection is an 8-bit element address word followed by a 2-bit frame-to-frame differential. An on-again-off-again procedure may be followed so long as normal frame operation occurs. Whenever four out of eight successive frame differentials are greater than the second threshold level, the status of the mode control signal switches to a logical 1. This corresponds to situation B of FIG. 3, a change from the frame mode to the element mode. The select control logic 138 may easily determine that such a change is occurring by noting the fact that the prior status of the mode control line 122 was a logical 0, whereas the present status of the mode control line 122 is a logical 1. Of course, since every element-to-element differential must be transmitted, the transmit control line is forced to be a logical 1 due to the connection of line 122 through OR gate 132. In the case of a change from a frame mode to element mode, the 8-bit mode word produced by circuit 142 is first transmitted in order to inform the receiver that a change of mode is occurring. Thereupon, the 8-bit element address and 4-bit element-to-element differential is transmitted. Assuming that the next portion of the same line is expressing motion, situation C of FIG. 3 next results: normal element-to-element operation. In this case, both the present and prior mode control status indications are logical 1s, as is the transmit control state. Therefore, since every element-to-element differential must be transmitted, only a 4-bit element-to-element differential is selected for transmission.

The final situation of FIG. 3, situation D, represents a change from the element mode into the frame mode. This case is recognized by the select control logic 138 due to the fact that the present status of the mode control line 122 is a logical 0 whereas the status for the immediately preceding picture element is a logical 1. Since this change brings the operation into the frame-to-frame mode and since the values of the first and second thresholds relative to each other have not been specified, it is theoretically possible that such a change will be represented by transmit control states either of 0 or 1. In the normal case, the first threshold level will be larger than the second threshold, and any change from the element mode to the frame mode will be indicative of a redundant frame-to-frame differential. However, for the sake of completeness and in order to account for all possible thresholds, both the redundant and nonredundant situations are represented in FIG. 3. For a nonredundant determination in situation D, which occurs when the transmit control state is a logical 1, the 4-bit mode word from circuit 143 must be transmitted, thereby representing the change of mode, followed by an 8-bit element address along with a 2-bit frame-to-frame difference. On the other hand, whenever the transmit control signal in situation D is a logical 0, corresponding to a redundant picture element, only the 4-bit mode word needs to be transmitted. Thereupon, the normal frame operation represented by situation A of FIG. 3 continues.

The foregoing transmit selections of the FIG. 3 truth table have not dealt with situations at the end of each line in the picture field. The last column of FIG. 3 defines signals to be added for the case in which the last picture element in a line is being processed. The purpose, of course, of the additional code words is to allow the receiver to maintain accurate and synchronous operation with the transmitter. Moreover, the particular choice of words to be sent is dictated by the operational mode currently utilized and the consequent requirements of the receiver to decode the signals in a completely unambiguous manner. During normal frame operation (situation A), either no signal at all is transmitted or an 8-bit element address followed by a 2-bit frame-to-frame differential. Thus, if the picture element being encoded is the last element in a line, all that is transmitted is an 8-bit end-of-line code word and the 8-bit representation of the line number. The 8-bit end-of-line code is a uniquely defined word, similar to the 4- and 8-bit mode words, which represents but one particular situation, the end of a line. Whenever there is a change from the frame mode to the element mode and whenever normal element mode is established (situations B and C in FIG. 3), the end of a line necessitates a change back to the frame-to-frame mode. The reason for this is that the embodiment of FIG. 1 is designed to operate by commencing the encoding of each line in the frame-to-frame mode. Consequently, the truth table of FIG. 3 specifies that a 4-bit mode word, signaling a change back to the frame-to-frame mode, should be transmitted prior to the 8-bit end-of-line number. For situation D, of FIG. 3, a change from the element mode to the frame mode, all that is required is a simple addition of the 8-bit end-of-line code and the 8-bit line number.

By utilizing the choice of code called for in FIG. 3, it is feasible to transmit a continous string of digital bits without inserting any additional timing or framing information. The principle foundation for this is that the special code words (i.e., the 4- and 8-bit mode words and the 8-bit end-of-line code) are of such a length and distinguishable character that they themselves permit the receiver to detect changes without impeding the code utilized. For example, when situation A, normal frame-to-frame operation, is being utilized, an 8-bit element address is transmitted followed by a 2-bit frame differential. Thus, while in this mode, the receiver is kept on the alert for 8-bit words. Consequently, the occurrence either of the 8-bit mode word or of the 8-bit end-of-line code informs the receiver that it must make appropriate adjustments to its logic operations. Thereafter, once the element-to-element mode is established, 4-bit differentials are transmitted. Thus, it is appropriate that the word signaling a change back to the frame-to-frame mode be a 4-bit word, for the receiver while operating in the element-to-element mode is adjusted to recognize 4-bit words. Thereupon, for the last picture element in the line, the receiver is alerted by the 4-bit mode word to look for an 8-bit word, whereupon it receives the 8-bit end-of-line code. In this fashion, the multiplexing apparatus of FIG. 1 serves the purpose of adjusting corresponding logic in the receiver apparatus such that the dual mode encoding may be efficiently and accurately conducted.

This alternate type of encoding achieves transmission efficiency by means of the functional interaction of an advantageous choice of code and a concommitant definition of what constitutes motion. It is contemplated that each nonredundant sample in the frame-to-frame mode be transmitted by means of a 10-bit word, 8-bits to define the element address and 2-bits for the differential. On the other hand, every element-to-element differential is to be transmitted by means of a 4-bit word, with an element address being transmitted only with the first differential in a series. The definition of motion utilized herein is that at least four of eight consecutive samples are greater than the threshold level. Accordingly, on the basis of eight successive samples, if three are nonredundant, 30 bits of information must be transmitted, since this is to be encoded in the frame mode. On the other hand, if four out of eight are greater than the threshold, the element-to-element mode will be utilized, and only 24 bits need to be transmitted, including the element address word at the beginning. Thus, for four out of eight samples being greater than the threshold level, frame-to-frame transmission in the present embodiment is quite a bit less efficient than element-to-element transmission.

It is also clear that in accordance with this definition of motion and choice of transmission requirements, it may for certain situations be irrelevant as to which mode is utilized. That is, under certain circumstances, while the type of code being utilized may appear to be the less profitable, any change of mode would entail an actual loss in efficiency due to requirements of including addressing information. This in fact occurs whenever between one and three out of eight consecutive samples are greater than the threshold level. Accordingly, the embodiments described herein feature the aforementioned hysteresis effect in that no change in mode occurs whenever between one and three out of eight consecutive samples are greater than the second threshold level.

The foregoing description of the FIG. 2 apparatus briefly mentioned a clearing function to be performed via line 148 by the select control logic 138. It is the purpose of that function to reset at zero all stored quantities in the threshold and frame decision circuitry 131, thereby preparing the encoding apparatus of FIG. 1 to commence processing of the next line in the frame-to-frame mode. This function is afforded by the select control logic 138 each time the 8-bit end-of-line code is transmitted. Thus, this aspect of the select control logic 138 is embodied by a configuration of gates which is responsive only to the particular code combination which defines the 8-bit end-of-line code. Further, the output of such a gating configuration is defined as a pulse on reset line 148 each time the 8-bit end-of-line code word occurs. Thereupon, the pulse on reset line 148 is energized, thereby clearing all flip-flops in the seven-stage delay line 210 and of resetting the output state of the 4-bit accumulator to 0000. This resetting, of course, has the effect of forcing the mode control line 122 into a logical 0 state, thereby closing switch 116 to terminal 123.

The only other aspect of the appartus of FIG. 1 which merits brief attention is its operation at system start-up. No separate provision for start-up has been made herein, so in accordance with this method, the frame memory will take a short time to fill up before the operation is completely efficient, since it can only do so by means of sequentially added differentials. Nonetheless, this technique still proves to be adequate, even for the first eight picture elements of each line which can be replenished only by means of frame-to-frame differentials due to the "four out of eight" algorithm used. Of course, it is quite within the capability of those skilled in the art to provide means whereby the frame memory may be updated more quickly, but such improvements have no effect upon the scope of the present invention. For example, such improvements are suggested in the aforementioned series of patents to F. W. Mounts.

Figure 4:
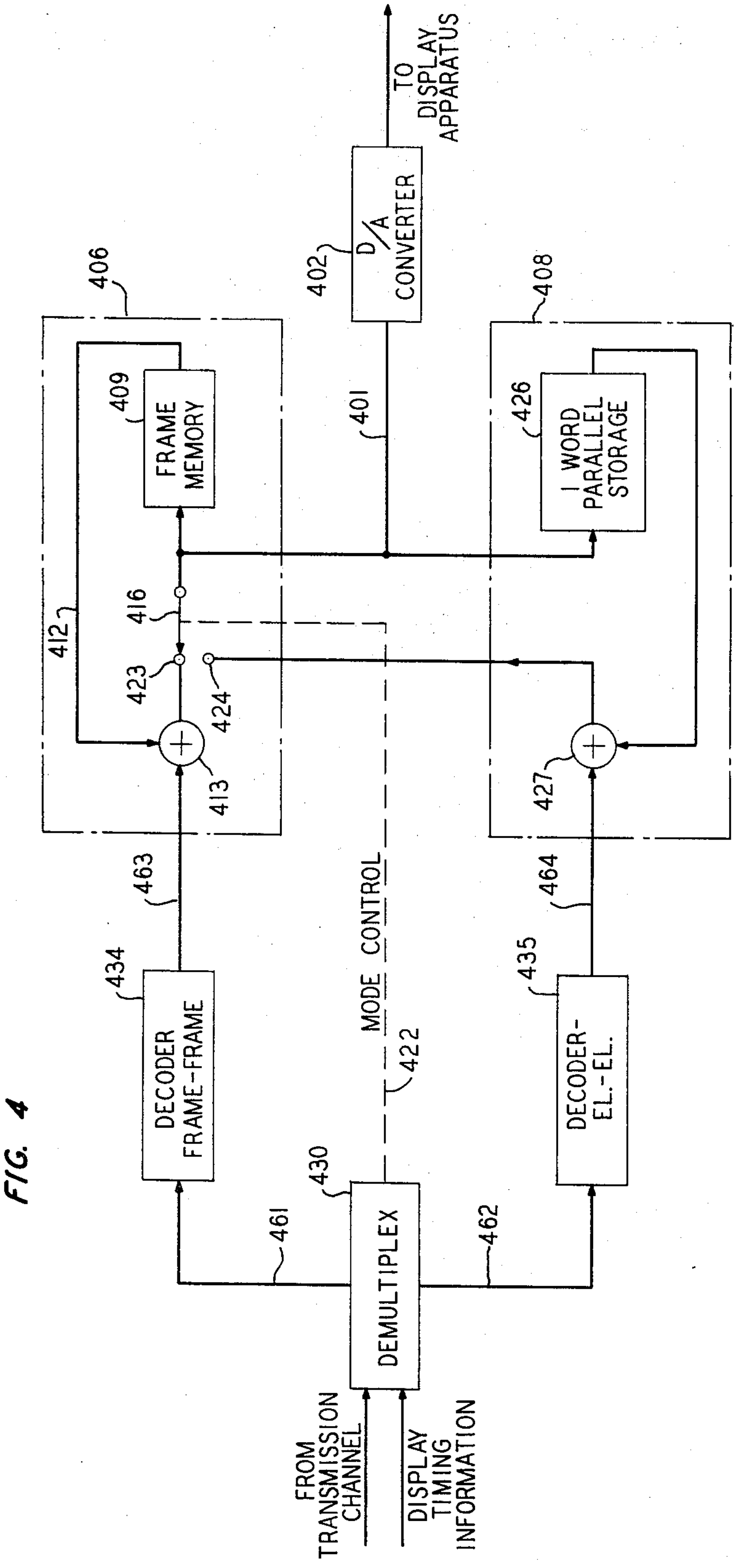
FIG. 4 shows a decoder which embodies the principles of the present invention and which is designed to operate in conjunction with the encoder of FIG. 1.

FIG. 4 shows a decoder which is designed to operate in conjunction with the encoder of FIG. 1. Since the purpose of the FIG. 4 decoder is simply to reverse the the processes conducted by the FIG. 1 encoder, each of the elements in FIG. 4 are closely analagous to similar elements in FIG. 1. Thus, whenever possible, only a cursory description of the FIG. 4 apparatus is rendered, with reference back to the analagous apparatus in FIG. 1 being made whenever possible. Accordingly, apparatus in FIG. 4 is numbered as nearly as possible to correspond to apparatus of similar function in the FIG. 1 embodiment (e.g., the frame memory 409 in FIG. 4 is identical to the frame memory 109 in FIG. 1).

At the heart of the decoder of FIG. 4 are two loop decoders 406 and 408 which perform the actual frame-to-frame and element-to-element conversion, respectively. In fact, the frame-to-frame decoder 406 is identical to the feedback circuitry including the frame memory 109 and adder 113 of the FIG. 1 frame-to-frame encoder 106. Similarly, the element-to-element decoder 408 is identical to the feedback circuitry of the element-to-element encoder 108, which includes a one word parallel storage means 126 and an adder 127. Moreover, the inputs both of the frame memory 409 and of the one word parallel storage 426 are fed from a switch 416 which determines whether the frame-to-frame mode or the element-to-element mode is utilized. Clearly, this apparatus corresponds identically to switch 116 and associated connections in FIG. 1, both in structure and in function. Thus, whenever switch 416 is closed to terminal 423, thereby establishing the frame-to-frame mode, picture element values are read out of the frame memory on line 412, and at adder 413 they are combined with corresponding differentials. Similarly, when switch 416 is closed to terminal 424, the element-to-element loop comprising element-to-element decoder 408 is closed, and previous element values from the one word parallel storage 426 are combined with corresponding element differentials by an adder 427. In both the frame-to-frame and the element-to-element situations, the combination of the prior picture element value (either from previous frame or previous element) with the corresponding updating differential is read into the frame memory 409, into the one word parallel storage 426, and onto an output line 401. Reading the quantity into the frame memory 409 produces an updating useful for the decoding of the subsequent frame, and storage of the combination in the one word parallel storage 426 constitutes preparation for an element-to-element decoding of the next differential to be received. In either case, the combination of the prior picture element value (i.e., prior frame or prior element, as appropriate) with the updating differential (i.e., frame differential or element differential, as appropriate) on output line 401 is subjected to an analog conversion by the digital-to-analog converter 402, whereupon it is coupled to the display apparatus. In summary, the frame-to-frame and element-to-element decoders 406 and 408 operate precisely to reverse the encoding process defined by the corresponding encoding apparatus in FIG. 1. In this fashion, picture element values which are coupled to the display apparatus are appropriately updated either in a frame-to-frame or an element-to-element context such that the presentation of the picture information proceeds uninterrupted.

In delivering the frame-to-frame and element-to-element differentials to the respective decoders 406 and 408, the apparatus of FIG. 4 simply reverses the code selection and multiplexing processes conducted by the apparatus of FIG. 1. Consequently, the string of data bits received from the transmission channel is coupled to a demultiplexer 430. The demultiplexer 430 functions to reverse the processes performed in the FIG. 1 encoder by the select control logic 138, the data selection circuit 139, and the parallel-to-serial converter 140. Thus, the demultiplexer 403 processes the input stream of digital bits, separates them into digital words in accordance with the expectations established by the FIG. 3 truth table, and couples the words to appropriate decoding circuitry whenever the timing is proper. Since, given the code specifications defined in FIG. 3, the design of logic to separate the various code words would be a straightforward and obvious process (for example, techniques for such design are presented in Introduction to the Logical Design of Switching Systems by H. C. Torng, Addison Wesley, 1966), this disclosure will not involve detailed description of circuit embodiments therefor. However it may be helpful for purposes of explanation briefly to separate the various logical functions which must be performed by the demultiplexer 430.

The block diagram of FIG. 4 shows display and timing information being delivered to the demultiplexer 430. Clearly, it is this timing information that establishes the timing sequence of operation for all of the apparatus of FIG. 4. Nonetheless, its delivery is shown only to the demultiplexer 430 for purposes of emphasis, since the block diagram of FIG. 4 contemplates that the demultiplexer 430 not only will separate the various items of information, one from the other, but will also deliver the separated elements of information to the appropriate decoding circuitry only at such time as the corresponding prior picture element is being processed from the frame memory 409. In this way, the demultiplexer 430 serves as a distribution means which couples digital words representing either frame-to-frame or element-to-element differentials with the associated decoding circuitry only whenever it is timely for that information to be decoded.

The first function which must be fulfilled by the demultiplexer 430 is that of separating the continuous string of digital bits into meaningful words. Thus, the demultiplexer 402 includes first logic apparatus which is sensitive to the fixed key words including the 4- and 8-bit mode words and the 8-bit end-of-line code. Responsively to the occurrence of these key words, this first logic apparatus energizes subsequent circuitry which is designed to separate the following plurality of bits into appropriate words. For example, upon the occurrence of a 4-bit mode word, the demultiplexer must "realize" that frame-to-frame mode will follow, and therefore the circuitry must be prepared to read and process successive 8-bit words corresponding to element addresses and 2-bit words corresponding to frame-to-frame differentials. On the other hand, whenever an 8-bit mode word is detected, the demultiplexer 430 realizes that the element-to-element mode is to follow, and consequently that subsequent information will be received in the form of consecutive 4-bit element-to-element differentials. In either case, it is the primary function of this first logic apparatus to prepare secondary circuitry in the demultiplexer to receive the incoming bit stream and to separate those bits into meaningful coded words.

The second function of the demultiplexer 430 is, once the incoming bit stream is separated into meaningful digital words, the distribution of those words out to the decoder circuitry. This must only occur, however, when the decoder circuitry is processing the corresponding area of the picture for display. Thus, it is contemplated that the demultiplexer 430 contains apparatus for comparing the element address of the differential being processed with the element address currently being displayed, as indicated by the display and timing information. At such time as it is appropriate that a given coded differential be delivered to either of the decoders 406 or 408. The demultiplexer 430 establishes a mode control signal on line 422 and couples the corresponding differential either to line 461 or 462. More particularly, when the demultiplexer 430 senses from the display timing information that a picture element for which it has an encoded updating differential is to be processed and displayed, two steps are performed. First, the switch 416 is set appropriately either to terminal 423 or to terminal 424 in response to the mode control signal on line 422. Secondly, the corresponding differential is then coupled to line 461 or 462 such that it may be decoded.

It may be recalled that, in the encoding apparatus of FIG. 1, all internal functions were represented in terms of 8-bit PCM codes. Due to the operation of quantizers 117 and 128, however, the output code for transmitted differentials was defined in terms of a second code conversion produced by code converters 134 and 135. For purposes of further internal operation, a PCM conversion was conducted at converters 170 and 171 such that the frame memory 109 and the one word parallel storage 126 code operate simply in terms of 8-bit PCM. In order to correspond to the FIG. 1 apparatus, the coder of FIG. 4 includes a pair of code converters 434 and 435 which convert the 2- and 4-bit received differentials back into an 8-bit signal processible by subsequent apparatus. In this fashion, the information utilized by the decoders 406 and 408 may be entirely within the context of an 8-bit, 256 level PCM signal. Thereupon, as represented respectively at lines 463 and 464, the actual frame-to-frame or element-to-element differentials are represented in a form in which they may be decoded into picture elements by decoders 406 and 408.

In summary, the decoder apparatus of FIG. 4 receives a continuous bit stream, separates it into meaningful encoded words, derives an indication of the decoding mode to be utilized, and once all this is accomplished, actually performs the associated frame-to-frame or element-to-element decoding. Finally, the synthesized picture element values are converted into analog quantities and conveyed to a display apparatus.

What is claimed is:

1. Apparatus for the encoding of information divided into frames, each frame being subdivided into lines consisting of a plurality of elements, said apparatus comprising:

means for developing differentials between each picture element and a corresponding picture element from a prior frame;

means for identifying nonredundant picture elements by evaluating the magnitudes of said differentials;

first means for encoding differentials corresponding to nonredundant picture elements as digital words of a first number of digits;

second means for encoding differences between consecutive picture elements in a line as digital words of a second number of digits; and means, responsive to said means for developing for selecting encoded words for transmission from said first and said second means for encoding, said means for selecting including means for evaluating the magnitudes of a plruality of consecutive ones of said differentials relative to a threshold level, and output means for transmitting words from said first means until the portion of differentials exceeding the threshold level is at least a first number, and thereupon for transmitting words from said second means until the portion of differentials exceeding the threshold level is less than a second number.

2. Apparatus as described in claim 1 wherein said first number of digits is less than said second number of digits, said apparatus further including means for associating encoded words selected for transmission with digital words identifying the location of the corresponding picture elements in the frame, every word selected from said first means being associated with a digital identifying word, but only the first of each series of words from said second means being associated with a digital identifying word.

3. Apparatus as described in claim 1 wherein said means for evaluating includes:

means for comparing said differentials with a threshold;

means for indicating the status relative to the threshold of a plurality of differentials;

means, responsive to said means for indicating, for coupling words from said first and said second encoding means to an output terminal for transmission.

4. In a system which utilizes information divided into frame intervals, each of which is subdivided into lines including a plurality of samples, encoding apparatus comprising:

differential encoding means for developing and quantizing the difference between each input sample and the previous sample in a line;

frame memory means for storing information corresponding to a frame of samples;

subtraction means for developing a difference between each input sample and a corresponding sample from the frame memory means;

control means for developing first and second output conditions in response to a plurality of successive differences from said subtraction means; and means responsive to said control means for updating said frame memory means utilizing one of the differences produced by said differential encoding means and by said subtraction means.

5. Apparatus as described in claim 4 wherein said control means includes:

means for comparing differences from said subtraction means with a threshold level;

means for indicating the status of a plurality of successive differences from said subtraction means relative to said threshold level; and bistable means for developing first and second output conditions responsively to the status from said means for indicating.

6. Apparatus as described in claim 4 wherein said means for updating includes:

first means for developing a combined value of the difference developed by said subtraction means and its corresponding sample from said frame memory means;

second means for developing a combined value of the difference developed by said differential encoding means and the previous picture element in the line; and means responsive to the output condition of said control means for selectively writing into said frame memory the combined value generated by said first or said second means for developing a combined value.

7. Apparatus as described in claim 6 wherein said means for selectively writing includes switching means for coupling said first means for developing a combined value with said frame memory means wherever said control means assumes a first output condition, and for coupling said second means for developing a combined value with said frame memory whenever said control means assumes a second output condition.

* * * * *